Aug. 12, 1952     H. C. CLAUSER ET AL     2,606,495
PYROTECHNIC DEVICE
Filed Sept. 30, 1947     4 Sheets-Sheet 1
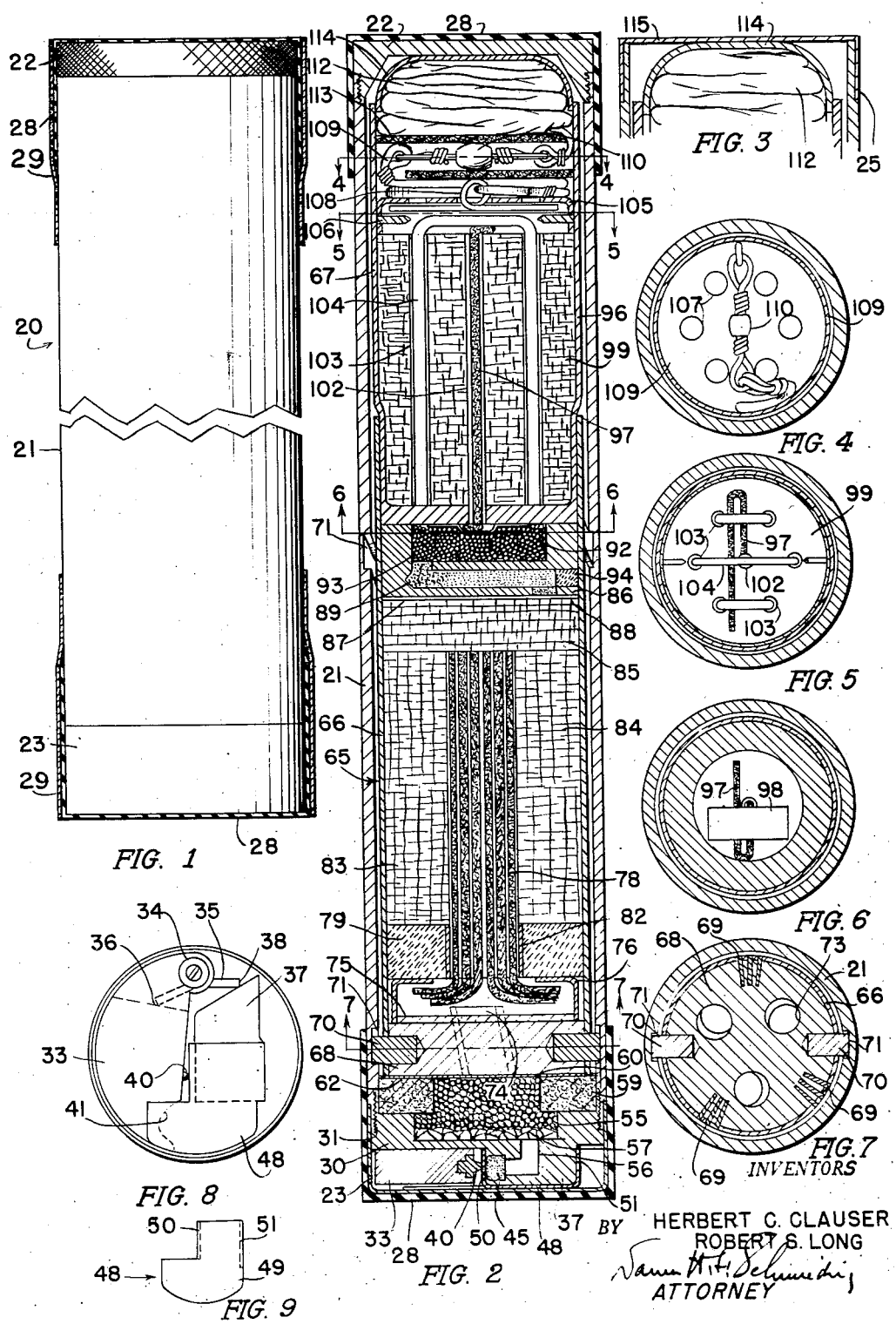
INVENTORS
HERBERT C. CLAUSER
ROBERT S. LONG
BY
ATTORNEY Aug. 12, 1952 H. C. CLAUSER ET AL 2,606,495
PYROTECHNIC DEVICE
Filed Sept. 30, 1947 4 Sheets-Sheet 2

INVENTORS
HERBERT C. CLAUSER
BY ROBERT S. LONG
ATTORNEY

INVENTORS
HERBERT C. CLAUSER
BY    ROBERT S. LONG
ATTORNEY

Aug. 12, 1952 — H. C. CLAUSER ET AL — 2,606,495
PYROTECHNIC DEVICE
Filed Sept. 30, 1947 — 4 Sheets-Sheet 4

INVENTORS
HERBERT C. CLAUSER
ROBERT S. LONG
BY
ATTORNEY

Patented Aug. 12, 1952

2,606,495

UNITED STATES PATENT OFFICE 2,606,495

PYROTECHNIC DEVICE

Herbert C. Clauser and Robert S. Long, Westerville, Ohio, assignors, by mesne assignments, to Kilgore Inc., Westerville, Ohio, a corporation of Ohio Application September 30, 1947, Serial No. 776,922

4 Claims. (Cl. 102—35)

This invention relates to pyrotechnic devices, and more particularly to a high altitude distress signal that can be fired safely while held in the hand.

One of the objects of this invention is to provide a pyrotechnic device having a light weight, water-resistant casing adapted to be held in the hand and launch a projectile which will rise to a relatively great height above the point of firing and discharge a visible signal.

Another object is to provide a pyrotechnic device of the character described in which the assembly and construction is such that it can be fired safely while held in the hand, the recoil from the initial expelling force being sufficiently low to permit the safe discharge thereof.

It is also an object to provide a pyrotechnic device having a rifled casing adapted to receive and carry a rocket type projectile in an ejectable position therein, in which there is a propelling means such that the projectile can be launched initially from the casing so as to rise to a predetermined height without harmful recoil or effects on the operator and in which a propelling charge contained within the projectile is rendered effective subsequently to the initial launching to carry the projectile to a relatively high elevation.

An additional object is to provide in a device of the character described a smooth, streamlined projectile adapted to contain a visible signal, such as a parachute suspended flare or a smoke pot, which is free of any external fins or stabilizing means, and which can be launched from a hand held mortar.

Still another object is to provide a light weight, water-resistant, rifled, mortar casing of relatively small diameter and short length which is adapted to receive and launch a self-propelling projectile carrying a self-contained flare or smoke signal which is independently fired from the projectile near the zenith of its flight, the mortar serving also as a shipping and carrying container for the projectile.

A further object is to provide a completely self-contained hand fired signal device capable of projecting a visible signal into the air to a height of approximately 1,000 to 2,000 or more feet above the point of firing, which is designed to permit a supply of such devices to be carried conveniently and safely in a belt or parachute harness, and which can be submerged in salt water for a relatively long period of time without impairing its operation or efficiency, and thereafter fired safely while held in the hand and without requiring the use of any auxiliary firing and launching equipment.

Yet another object is to provide for a high altitude projectile of the character described a light weight, water resistant carrying container having as a part thereof a firing apparatus and a safety locking mechanism to prevent accidental or inadvertent discharging of the projectile, the container being constructed to launch the projectile safely while held in the hand, and to impart sufficient rotation to the projectile on launching to stabilize its flight and maintain it on a substantially vertical flight path thereafter without the aid of external fins or flight stabilizing means.

Another object also resides in the provision of a projectile of the rocket type having jet discharge tubes communicating at one end with the rocket fuel chamber and at the other end with a chamber in which an initial propelling charge is contained, the tubes being offset with respect to the latter chamber to provide against premature igniting of the rocket fuel.

It is also another object to provide a rocket type of projectile constructed with a powder cell for discharging a signal contained therein, the powder cell being located above the rocket fuel within a housing providing for a delayed igniting of the powder from the burning rocket fuel which prevents a premature discharging of the signal.

Another and additional object resides in the provision of a projectile of the rocket type wherein a two-piece construction is utilized to provide separable members, the lower of which contains rocket fuel while the upper provides a greater volume of space than heretofore available within a limited diameter size of projectile for the storage of signal material, and which thereby eliminates the necessity for using a separate container for such signal material, as well as providing a member adapted to be ejected from the projectile at approximately the zenith of its flight.

Also another object is to provide a projectile of the type described wherein a two-piece construction is utilized to provide a separate container in which signal smoke material is adapted to be stored and burned when discharged from the projectile, which has a parachute attached thereto for delaying its descent, and which is constructed to provide for the discharge of smoke from the top of the container whereby the parachute serves to trap such smoke to increase its visibility and the thermal effect produced by the hot smoke is utilized to further delay the descent of the signal container.

It is also an object to provide for a device of the character described a projectile containing a visible signal which is adapted to be discharged from the projectile when it reaches approximately the zenith in its flight, the signal having an external rotating means attached thereto to delay its rate of descent.

Another object also resides in the provision of a projectile of the rocket type having a smooth, streamlined outer surface free of vanes, fins and other mechanical stabilizing means, which is constructed to maintain stability in flight through rotation imparted thereto about its longitudinal axis, and which is adapted to discharge a parachute suspended signal therefrom, the parachute being provided with a swivel means to prevent spinning of the signal from tangling or fouling the parachute.

Further objects and advantages of the present invention will be apparent from the following description reference being had to the accompanying drawings wherein preferred forms of embodiments of the invention are clearly shown.

In the drawings:

Fig. 1 is a partially broken view in side elevation illustrating a pyrotechnic device embodying one form of the present invention;

Fig. 2 is an enlarged view in vertical section through the device of Fig. 1, taken substantially on the center line thereof;

Fig. 3 is a partial vertical sectional view of the upper end of Fig. 2 showing an alternative form of closing cover for the signal container, the rubber sealing cap and tape being removed;

Fig. 4 is a view in horizontal section taken substantially on the plane 4—4 of Fig. 2;

Fig. 5 is also a view in horizontal section taken substantially on the plane 5—5 of Fig. 2;

Fig. 6 is a view similar to Fig. 4 taken substantially on the plane 6—6 of Fig. 2;

Fig. 7 is another view in horizontal section taken substantially on the plane 7—7 of Fig. 2;

Fig. 8 is an elevational view of the bottom or lower end of the device shown in Fig. 2, the closing cover being removed to show the striker and safety mechanism;

Fig. 9 is an elevational view on a reduced scale illustrating the form of safety clip shown in Fig. 8 removed from the container;

Figure 10:
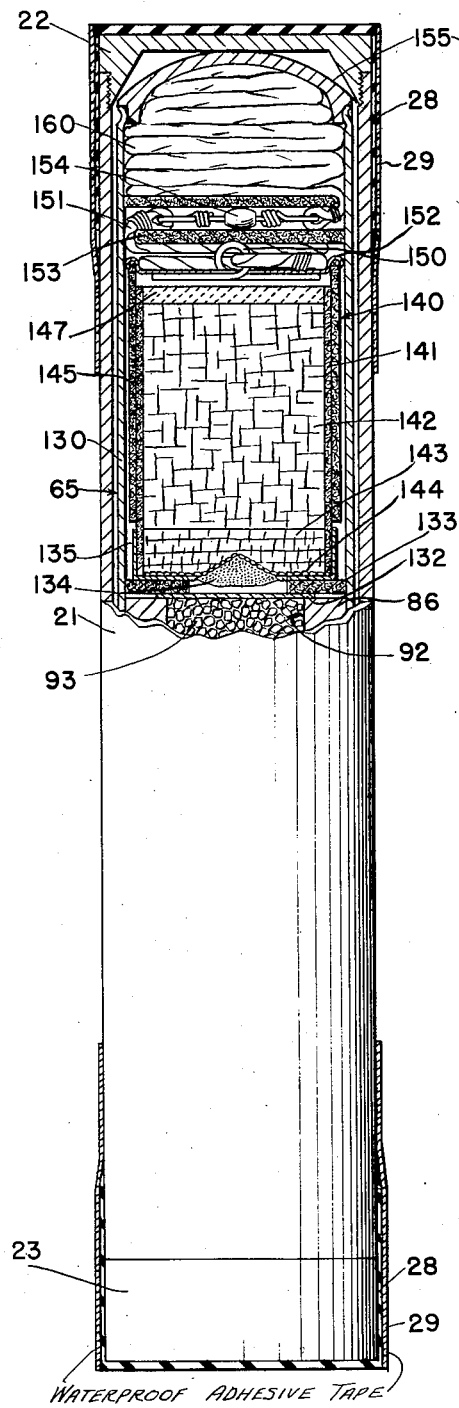
Fig. 10 is a view partially in vertical section and in elevation illustrating a different form of signal construction.

Referring further to the drawings, the pyrotechnic device generally indicated at 20 in Fig. 1 includes an elongated cylindrical casing or tube 21 having a top and bottom closing cover 22 and 23. The top cover 22 in one form is threadedly connected to the tube 21, while the bottom cover 23 is secured thereto by means of a slip-fit. However, if preferred, the top cover can also be secured to the tube 21 by means of a slip-fit as shown at 25 in Fig. 3. To make the tube 21 water-resistant, both the top and bottom covers have sealing covers 28 placed over them which are formed of a thin film of rubber. These sealing covers are formed by cementing a cap of 2½ to 3 inches of neoprene balloon rubber, for example, over these members. A preferred method of providing this rubber seal, however, is to dip the ends of the casing with the covers 22 and 23 in position into a solution of liquid latex, which dries to form a seal suitable for making the casing water-resistant. A layer of waterproof adhesive tape 29 is then added over the rubber 28 and the container 20 remains water-resistant in salt water when submerged for a period of about seventy-two hours and at a depth of six feet.

The tube 21 is constructed preferably of aluminum or other suitable light weight metal and is approximately 8 inches in length with a diameter of about 1.65 inches. This casing is provided at the lower end with an aluminum propelling charge housing 30 which is threadedly connected thereto as at 31 in Fig. 2. To this housing a brass striker 33, Figs. 2 and 8, is pivotally connected by means of a bushing and hinge screw 34. A coil spring 35 is wrapped about the stem of screw 34 so that one end thereof bears against the striker as at 36 and the other end thereof against the projecting shoulder 37 of housing 30, as shown at 38 in Fig. 8. The striker 3 is also provided with a firing pin 40. Thus when the striker 33 is swung back, as by means of the operator's thumb pressed against the curved surface 41, and released, spring 35 provides sufficient force to snap the firing pin 40 against the primer or percussion cap 45 mounted in shoulder 37 thereby causing the initial firing and explosion to launch the rocket from tube 21.

A safety clip 48 is provided to prevent accidental or inadvertent firing of the primer. This device, as seen in Figs. 2, 8 and 9, comprises a flat plate 49 having upwardly projecting side members 50 and 51 adapted to be slid into position along the inner and outer edges of shoulder 37 so as to cover the primer 45 and prevent pin 40 from striking it while the safety clip is in position. The side members 50 and 51 engage the shoulder 37 with a slip-fit so that the safety device can be removed easily whenever it is desired to fire the rocket.

Formed within the housing 30 is a recessed area 55 which is connected by means of the small right angled passage 56 with the area in which the primer 45 is mounted. The area 55 is filled with a black powder propelling charge 57, the grain size thereof being sufficient to prevent it from falling into or entering the passage 56. A felt washer 59 having a central opening 60 formed therein is mounted on top of housing 30. This washer serves to form a pocket with the area 55 holding the black powder charge 57 in place. Covering the opening 60 in the felt washer is a crinoline retainer disc 62 which prevents the powder from being spilled out of the opening 60.

Removably positioned within the tube 21 is a projectile 65 of the rocket type. The rocket 65 comprises in general a lower aluminum casing 66 into which is telescoped with a slip-fit an upper aluminum casing 67 as illustrated in Fig. 2. The lower casing 66 in turn is closed at the bottom end with an aluminum or, if preferred, other metal such as brass or steel, jet housing 68 which seats normally against the disc 62. Housing 68 is connected to the casing 66 by means of several pins or brass brads 69, Fig. 7, driven through the casing 66 and into the housing 68. In the preferred form of construction the bottom edges of casing 66 are bent or crimped over to form a flange support upon which the housing 68 rests, the brads 69 then being driven into place as previously described and shown in Fig. 7.

Aluminum pins 70, forming rifle lands, Figs. 2 and 7, are secured within the housing 68 and project therefrom one on each side in diametrically opposed positions, so as to extend out through the wall of casing 66 to engage with a spiral groove or rifling 71 formed along the interior wall surface of tube 21.

With this construction it will be apparent that when the propelling charge 57 is ignited the projectile 65 will be expelled from tube 21. The engagement of pins 70 within the groove 71 thus impart a rotation to the projectile about its longitudinal axis which is sufficient to maintain it in a substantially vertical flight path after being initially discharged and before the rocket fuel is ignited. There is thus provided a rocket type of projectile which is free of externally mounted vanes, fins or other mechanical types of flight stabilizing means, and which utilizes the spin imparted thereto upon launching to maintain its stability while in flight until the rocket impulse is effective in maintaining and accelerating it.

As shown in Fig. 7, a plurality of bores 73 are formed in the aluminum jet housing 68 which provide open passages communicating through the housing. Within each of these passages a steel jet tube 74, Fig. 2 is secured to provide a heat resistant conduit through which the hot gases generated by the burning rocket fuel are discharged to drive the projectile 65. These passages are drilled through the housing so as to form an angle of about 12 degrees to the vertical, so that the gases discharging therethrough tend to maintain the rotational direction previously imparted to the rocket upon launching. This construction thus permits the projectile to be constructed more compactly with a smooth, streamlined outer surface free of externally projecting stabilizing members.

In addition to the steel tubes 74 and to further protect the housing 68 from the heat generated when the rocket is burning, an insulating disc of asbestos 75 is positioned on top thereof. This disc 75, which is about $\frac{3}{32}$ of an inch in thickness, is formed with openings therethrough in register with and through which the jet tubes 74 extend to provide for expelling the gases required to drive the rocket in its flight. A steel cup 76, having a central opening therein of about ½ inch in diameter, covers the disc 75 and forms therewith a chamber for the gases which are discharged therefrom through the jet tubes 74 to drive the rocket. Positioned within this chamber formed between cup 76 and disc 75 are the ends of several strips of quickmatch 78 which project upwardly through the central opening in cup 76 and into the interior of the rocket.

A fire clay choke 79 formed with a central opening therein surrounds the quickmatch and extends from the copper retainer ring 82 in said opening to the inner wall surface of casing 66. The ring 82 prevents the clay from crumbling into the central opening of cup 76 and choke 79 in turn separates the block or charge 83 of pressed rocket fuel from the lower part of the rocket. This choke also serves to protect the lower part of the projectile from the heat generated by the burning rocket fuel and to direct the gases generated thereby into the interior of cup 76 from which they are expelled through the jet tubes 74. Above charge 83 a second and third charge 84 and 85 of similar pressed rocket fuel are also provided. The charge 85, however, extends across the entire inner diameter of casing 66 so as to enclose the upper ends of the quickmatch 78 as shown in Fig. 2.

Separating the upper charge of rocket fuel 85 from the aluminum delay fuse housing 86 is a cardboard disc 87 having a notch 88 opening in one side thereof. This disc is provided to prevent the heat generated by the burning rocket fuel from reaching the upper powder train prematurely.

The delay fuse housing 86 is provided with a horizontally extending central passage 89 which communicates at one end (through a right angle turn) with the notch opening 88 formed in the disc 87. The other end of passage 89 also communicates through a right angle turn with a recessed chamber 92 formed in the upper part of the housing. This chamber forms a pocket which is filled with an expelling charge of black powder 93 which serves to discharge the casing 67 from casing 66. Passage 89 is also packed with black powder so as to form a delay fuse or charge which when lighted through the opening 88 from the burning rocket fuel will burn for a period of approximately four seconds before reaching the powder in chamber 92. The opening, if desired, can be packed with a transition charge of powder. A plug 94 of fire clay seals off the open end of passage 89 which is formed when the passage is drilled in the housing. It will be apparent from this construction that fire from the burning rocket fuel will be delayed sufficiently to prevent the inadvertent or premature firing of the signal material stored above it.

Casing 67 which, in the construction shown in Fig. 2 for example, is provided with a candle 96 of smoke composition material so as to form a smoke pot upon discharge, is inserted in the upper end of casing 66 with a slip-fit and seats on top of the fuse housing 86. A central aperture is formed in the bottom of casing 67 through which a strip of quickmatch 97 is inserted. The lower end of this quickmatch is folded over as seen most clearly in Fig. 6, and held in position above the powder 93 with a strip of adhesive material 98, such as scotch tape. The pressed smoke composition 99 in casing 67, which as seen in Figs. 2 and 5, is provided with a central passage 102 up through which the quickmatch 97 extends. A plurality of substantially equally spaced vertical passages 103 also extend up through the smoke composition 99. These passages 103 are generally spaced about the central passage 102 and have strips of firecracker fuse material 104 inserted therein which are connected at their upper ends with the upper end of quickmatch 97 as seen in Fig. 5. Thus when the quickmatch 97 burns the fuse material 104 is lighted and burns the smoke composition rapidly and evenly and in all blocks thereof at substantially the same time from top to bottom.

The upper end of casing 67 is closed with a cap member 105 which is secured in position by means of brads 106 driven through the outer walls of the casing as shown in Fig. 2. This cap 105 is formed with a plurality of circular openings 107, Fig. 4, substantially equally spaced about the center thereof which are open and place the interior of the smoke pot in communication with the upper part of the rocket. With this construction, it is to be noted that the openings 107 provide for the discharge of the smoke from the top of casing 67, rather than the bottom in the customary manner. The smoke discharging from the top of the casing is trapped within the open folds of the parachute, and its visibility thus is increased since it forms a substantial cloud rather than a streamer, as when discharged from the bottom. Also, the underside of the parachute can be colored, if desired, the same as the smoke and thereby further increase the visibility. This construction also permits the thermal effect produced by the hot smoke and gases discharged from the top of casing 67 to be utilized to further delay the descent of the signal, since the heated gases and smoke trapped under the parachute tend to add to the buoyancy thereof.

Also attached to the cap is a swivel connection 108 to which the asbestos suspension cords 109 of the parachute 112 are connected. A second swivel connection 110 is fastened in the cord 109, but is spaced above the first swivel 108 a sufficient distance to be free of any residue material which may be formed above the cap 105 from the burning of the signal material. This second swivel thus remains free and clear at all times and serves to prevent the parachute upon opening from spinning or twisting, and thereby failing to operate properly, from the rotation imparted to casing 67 when it is discharged from the rapidly spinning casing 66.

The projectile 65, having an essentially two-piece construction comprising casing 66 and 67, thus provides an upper member which can be utilized directly as a smoke pot, for example. This casing 67 serves as a container in which the smoke signal material can be stored and burned, and which provides a greater volume of storage space than heretofore available within a given or limited diameter size of projectile. Since the casing 67 forms the signal material container, the signal material can be packed therein directly without requiring the use of a separate container for that purpose which thereby simplifies the construction and improves the operating efficiency in discharging the signal.

The parachute is folded and packed with cardboard separators 113 in the usual manner. An aluminum projectile cap 114 is provided to seal the end of casing 67 and hold the parachute in its packed position. Cap 114 is secured in position with a slip-fit or by crimping the upper edges of casing 67 around the lower edge of the cap. Tube 21 in turn is closed with a light weight steel cover 22 which can be threadedly secured to the tube 21 as shown in Fig. 2, or if preferred by means of a cover 115 having a slip-fit as illustrated in Fig. 3.

To launch the rocket 65 the tape and rubber seals 28 and 29 are removed or broken at each end of tube 21. The tube 21 is then held vertically in the hand of the operator and the cover 22 or 115 removed, depending upon which type is used. Cover 28 is also removed from the lower end of the casing and the safety clip 48 pulled down out of position. The striker 33 is then swung back through an angle of about 120 degrees and released. Firing pin 40 strikes the primer 45 and ignites the black powder charge 57 in passage 56 which in turn explodes the powder in chamber 55. The burning of this relatively small amount of black powder in chamber 55 creates sufficient force to launch the rocket 65 from the tube 21. However, this initial expelling force is sufficient to carry the rocket to a vertical height only of about 15 to 25 feet above the point of firing. During this initial flight period the rocket is maintained in substantially vertical upward path because in being expelled from the tube 21 the pins 70 at the lower end of the rocket follow the upwardly spiraling groove or rifling 71 which thereby impart sufficient spin to the rocket as it leaves tubing 21 to maintain its stability on its upward course during the initial stage of its flight.

The igniting of charge 57 in addition to launching the rocket, as previously described, burns through disc 62 and up through the jet tubes 74 to ignite the quickmatch 78. This in turn ignites the pressed rocket fuel charges 83, 84 and 85. The gases generated by the burning of the rocket fuel are discharged in turn down through the jet tubes 74. This imparts the propelling thrust to the rocket carrying it upward from the height reached from the initial discharge, of approximately 15 to 25 feet above the point of firing, to its zenith of about 1,000 to 2,000 feet above the point of firing, depending on the quantity and type of rocket fuel used.

By the time the rocket fuel is burned, the powder in passage 89 is ignited. After approximately a four second delay, during which interval the rocket is ascending to its zenith, the powder 93 in chamber 92 ignites and expels the casing 67 out of the casing 66, casing 66 then falling free under the force of gravity. Casing 67 containing the smoke candle 96 is forced upwardly, the quickmatch 97 having been ignited from the burning of the powder in chamber 92. The burning of the quickmatch 97 in turn ignites the fuse material 104 which then ignites and burns the smoke composition 99. This material burns at a sufficiently rapid rate for enough pressure to build up within the upper end of the projectile to blow CP 114 from the end of casing 67 and forcibly eject the parachute 112. The opening of the parachute 112 thus forms a canopy which tends to trap the smoke from the burning candle 96 suspended therebelow in the form of a cloud. The smoke is heated to a relatively high temperature as it discharges from the top of casing 67 and collects beneath the parachute whereby a thermal effect is produced which tends to provide a slower rate of descent for the parachute than otherwise. In addition to slowing the descent of the parachute, and thus making the smoke signal visible for a longer period of time, the trapping of the smoke within the parachute to form a cloud, rather than a streaming trail of smoke, also increases the visibility of the signal particularly since the underside of the parachute is colored to match the color of the smoke signal being used.

Figure 12:
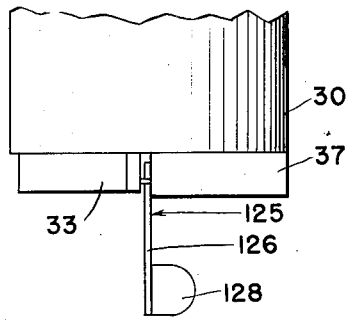
Fig. 12 is a partial elevational view showing a modified form of safety clip, the clip being down in a position to permit firing the signal.
Figure 13:
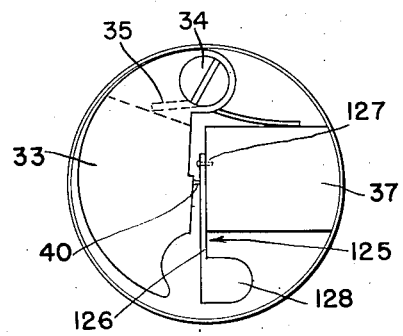
Fig. 13 is an elevational view of the lower or bottom end of the device shown in Fig. 10 illustrating the form of safety clip and striker mechanism used, the safety being "on"

A modified form of rocket construction is shown in Fig. 10 wherein the signal to be used is illustrated as a flare type. The construction and operation of this device is substantially similar to that shown in Fig. 2. It will be noted, however, that as shown in Figs. 12 and 13 a different form of safety clip 125 is provided for the striker 33. In this form the safety clip comprises an arm 126 which is pivotally connected to the inner surface of shoulder 37 by means of a pin 127. A finger grip 128 is formed at the end of arm 126 which facilitates swinging it in and out of position with respect to the firing pin 40. Thus when the arm 126 is in the up position i.e., the normal carrying and closed position the firing pin of striker 33 cannot reach the primer and thereby prevents the inadvertent firing of the rocket or its discharge due to a sudden jar or rough handling.

The projectile 65 is formed with a single outer tubing or casing 130 which combines and replaces the two casings 66 and 67 previously described. Otherwise the lower part of the rocket is constructed in exactly the same way as previously described in connection with Fig. 2.

Referring further to Fig. 10 the central opening in the fuse housing 86 is covered with a crinoline retainer disc 132 which in turn is covered by a chipboard retainer washer 133. A priming charge 134 composed of readily ignitable material is positioned above the disc 132 so as to project downwardly through a central aperture formed in the lower closure member 135 of the candle assembly 140 and into the washer 133. This cap or closure member 135 is composed of jute fibre and serves to close the lower end of the candle or flare 140. A paper tube 141 extends upwardly within member 135 and contains an upper increment of flare composition 142 which rests upon a somewhat smaller increment 143 of somewhat faster burning flare composition. Beneath the block 143 and covering the bottom of cap 135 and the upwardly projecting part of the prime button or charge 134 is a train of black powder 144 which serves as an igniting charge.

At the upper end of candle 140 is an outer paper tube 145 which telescopes down over the tube 141. Covering the upper end of the charge 142 is a header 147 of fire clay which also serves to seal the end of tube 141. The outer tube 145 is in turn closed at its upper end with a metal plate 150 which has its outer edges bent over and crimped to the sides of tube 145.

Folded and packed in the usual manner within the upper end of tubing 130 is a parachute 160 which is inserted so as to rest upon plate 150 when folded. The asbestos suspension cords 151 are connected to a swivel 152 in the usual manner and extend at their lower end through a notch formed in the separating disc 153 to the center of plate 150 where they are secured. A second swivel connection 154 is fastened in the cord 151, but is spaced above the swivel 152 as previously described. This swivel 154 thus remains free and unobstructed at all times and prevents the parachute upon opening from spinning or twisting.

Figure 11:
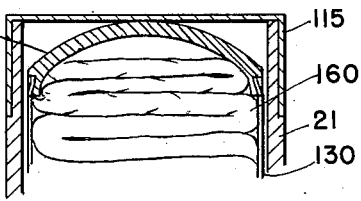
Fig. 11 is a partial vertical sectional view through the upper end of the device shown in Fig. 10 illustrating an alternative form of closing cover for the signal container, the rubber sealing cap and tape being removed.

The upper end of tubing 130 is closed with an aluminum cap 155 which is received therein with a slip-fit. Closing the upper end of casing 21 is a light weight metal cover 22 which can be threadedly secured thereto as previously described and shown in Fig. 2, or fastened by means of a slip-fit as illustrated at 115 in Figs. 3 and 11.

In operation, the charge 93 expels the candle 140 from the tubing 130 after the rocket fuel has been burned almost completely and carried the projectile 65 to its approximate zenith. Fire from chamber 92 burns through disc 132 and ignites the prime charge 134 and powder 144, which then ignites block 143 of flare composition. As the candle 140 floats downward, suspended by the parachute 160, the second block 142 is ignited from block 143 and starts to burn.

It will be apparent from the above disclosure that there is provided a light weight, water-resistant and self-contained unit which can be held in the hand to launch a high altitude rocket contained therein. The rocket in turn is provided with a self-contained signal, such as a flare or smoke candle, having means attached thereto to delay its descent, which is independently fired from the rocket when it reaches approximately its zenith in flight.

Figure 14:
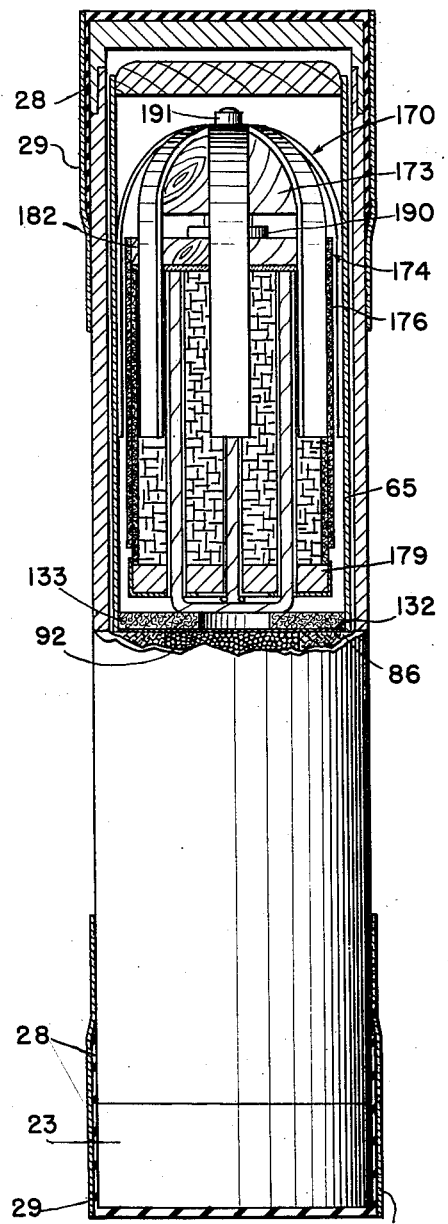
Fig. 14 is a view partially in vertical section and in elevation illustrating one form of the pyrotechnic device having a modified form of signal suspending apparatus shown packed within the closed container.
Figure 15:
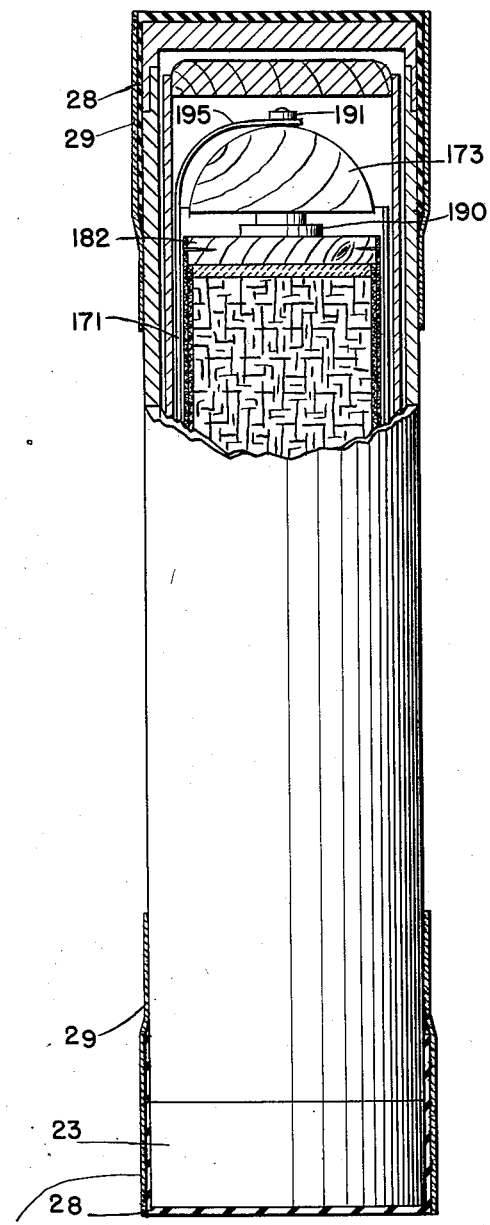
Fig. 15 is a view similar to Fig. 14 showing still another form of signal suspending apparatus attached to the projectile within the closed container.
Figure 19:
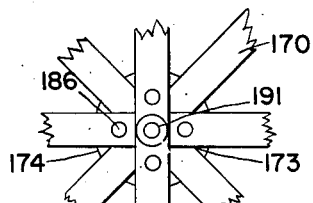
Fig. 19 is a partial top elevational view of a modified form of attachment for the signal suspending apparatus, the vanes being rotatably mounted and shown in the extended or flight position assumed after being discharged from the projectile.
Figure 20:
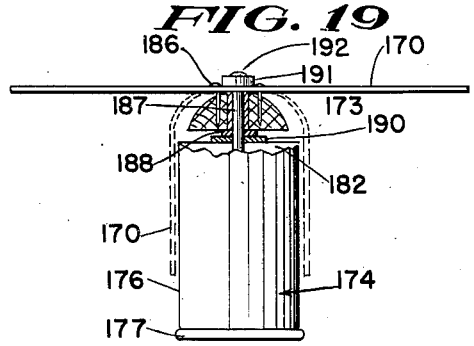
Fig. 20 is a side elevational view of the signal suspending apparatus of Fig. 19 illustrating a rotating head attachment to the signal and also showing in dotted lines the position occupied by the vanes when packed within the container.

In Figs. 14 and 15, a modified form of rocket construction is illustrated wherein the folded parachute previously described in connection with the candle 96 of Fig. 2 and the flare 140 of Fig. 10 is replaced with externally mounted flat rotating vanes 170, as shown in Fig. 14, or with a single curved vane 171 as seen in Fig. 15. As shown in Fig. 14, the vanes 170 are rotatably mounted and folded down alongside of the candle within the upper end of the projectile, being secured directly to a rotating head 173 attached to the candle 174 as illustrated in Figs. 19 and 20. The single curved vane 171, shown in Fig. 15, is of the type illustrated generally in Figs. 21, 22 and 23. However, in Fig. 15 the vane 171 is shown rotatably mounted similar to vanes 170.

Figure 17:
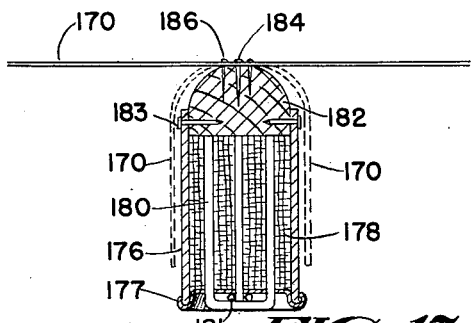
Fig. 17 is a side elevational view of the signal suspending apparatus shown in Fig. 16 having a fixed attachment to a modified form of signal, the vanes being shown in the closed or packed position in dotted lines.

The candle 174, as illustrated in Fig. 17, comprises in general an outer fibre tube 176 positioned within the upper end of the projectile and having a metal plate 177 crimped to the lower end thereof to form a closure member. Pressed smoke composition material 178 having a plurality of vertically extending passages formed therein is contained within the tube 176. Strips of fuse material 180 extend up through the smoke composition, as shown, being connected at the bottom with a strip of quickmatch 181 on the outside of plate 177. Thus when the quickmatch 181 is ignited, as the candle is expelled from the projectile as previously described, the fuse material burns and ignites the smoke composition.

A modified form of candle is also shown in Fig. 14. This construction is similar to that described in connection with Fig. 17, with the exception that the bottom closure member is provided with a lead ballast disc 179 to maintain the stability of the candle as it is suspended beneath the vanes 170 after being expelled from the projectile.

Figure 16:
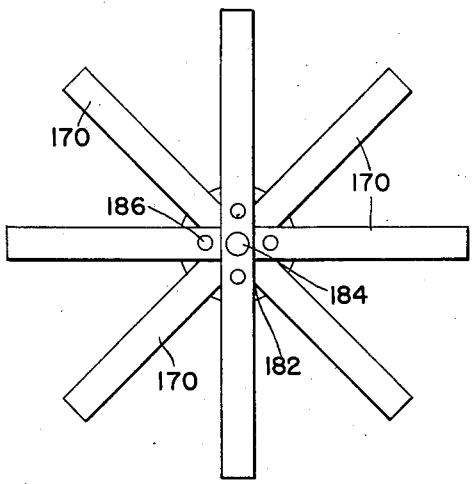
Fig. 16 is a top elevational view of the signal suspending apparatus shown in Fig. 14 in the extended or flight position assumed after being discharged from the projectile.
Figure 18:
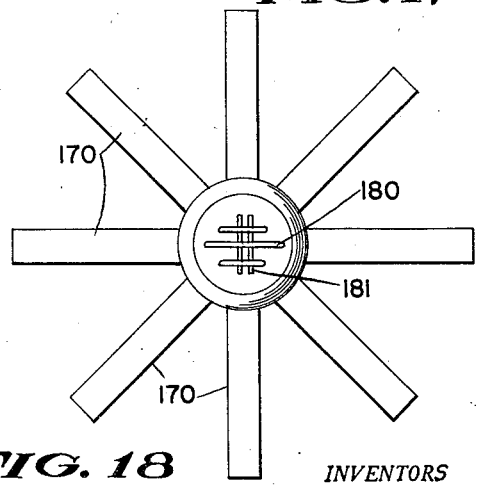
Fig. 18 is a bottom elevational view of the device illustrated in Fig. 17.

Closing the upper end of tube 176 is a fixed wooden plug 182, Figs. 17 and 20, fastened by means of the pins 183. In Fig. 17, for example, the plug 182 is substantially ogival in contour while in Fig. 20 the plug form is flat. Attached to plug 182, Fig. 17, by means of a centrally positioned wood screw 184 and the small nails 186 equally spaced thereabout are a plurality of vanes 170 formed of flat spring steel. Each vane is approximately ⅜ inch in width by 6½ inches in length and of sufficient flexibility to be folded down on the sides of the candle as shown in Fig. 14, and as indicated by the dotted lines in Fig. 17. After the candle 174 is discharged from the projectile tube 67 in the form shown in Fig. 2, or from the tube 130 of Fig. 10, the vanes 170 spring into the extended position shown in Figs. 16, 17, and 18. The descent of the candle 174 creates sufficient pressure under the vanes 170 to cause rotation thereof in a horizontal plane and delays the descent substantially. Under certain conditions the vanes have been observed to spin with such rapidity as to provide an upward lifting force sufficient to lift the candle and thus further delay the descent thereof.

A modified form of mounting for vanes 170 is illustrated in Figs. 19 and 20. The vanes 170 are connected to the rotating head 173 by means of the nails 186. The head 173 is in turn rotatably connected to the plug 182, a pin shaft 187 being received in an eyelet bushing 188 secured in the head. The lower end of the bushing 188 is flanged outwardly and seats upon a washer 190 secured to the upper end of plug 182. At its upper end the shaft 187 is secured with a nut 191 soldered thereto as at 192. In this modification it will be apparent that as the candle 174 descends, after having been discharged from the projectile as previously described, the upward pressure of the air causes the extended vanes to rotate. Such rotation causes rotation of the head 173, to which the vanes 170 or 171 are attached, with respect to the candle 174 which remains substantially stationary while descending. Under certain conditions this form of mounting the vanes 170 and 171 has been found to provide satisfactory operating characteristics.

Figure 21:
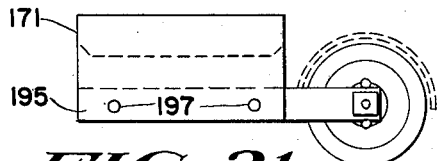
Fig. 21 is a top elevational view of still another form of signal suspending apparatus.
Figure 22:
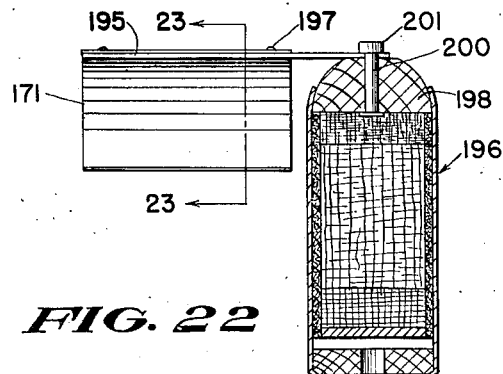
Fig. 22 is a side view partially in elevational and in section of the device shown in Fig. 21.
Figure 23:
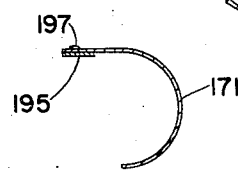
Fig. 23 is a vertical sectional view through the vane and taken substantially on the plane 23—23 of Fig. 22.

Referring to Figs. 21, 22 and 23, a single vane 171 curved to form a substantially semi-circle is provided. The vane portion is connected to an arm 195 formed of spring steel having sufficient flexibility to provide for the arm and vane being bent down to curve around the flare assembly 196 when packed within the projectile as shown in Fig. 15. The vane portion is connected to the arm 195 by means of a pair of small rivets 197.

At its inner end the arm 195 is shown connected to the candle assembly 196, for example; however it will be apparent that if preferred this construction can be used with either the candle assembly 96 of Fig. 2, the candle assembly 140 of Fig. 10, or the candle assembly 174 of Figs. 17 and 20. In the form shown in Fig. 22 the candle assembly 196 is provided with a fixed wooden head 198 having an ogival contour. A pin shaft 200 extends up through this head and the inner end of arm 195. The arm is held in position on the upper end of this pin with a nut 201 soldered thereto. In operation, after the candle assembly 196 has been expelled from the projectile, the arm and its attached vane spring into the extended position shown in Figs. 21 and 22. The upward force created against the vane 171 provided by the descent of the candle assembly 196 causes the rapid rotation thereof sufficient to delay the descent substantially.

From the above disclosure it will be apparent that there is provided an efficient and effective suspending means for the candle assembly which can be packed readily within a relatively small diameter high altitude projectile, and which can be discharged without tangling or fouling regardless of spinning motion imparted thereto from the projectile, or adverse wind and weather conditions.

While the forms of embodiments of the present invention as herein disclosed constitute preferred forms, it is to be understood that other forms might be adopted, all coming within the scope of the claims which follow:

We claim:

1. A projectile having a casing forming a container for the storage of ignitable signal material and a folded parachute, said casing having a perforated closure member connected to the top thereof for the discharge of smoke and gases from the combustion of said signal material into the parachute when open, said parachute being attached to said closure member by means of a swivel connection positioned above the closure member sufficiently for operation free of any combustion residue formed thereon.

2. A pyrotechnic device adapted to be ignited in the air comprising a casing forming a container having ignitable smoke producing material stored in the bottom thereof and a folded parachute in the top, said casing having a perforated closure member separating the smoke producing material from the parachute and providing for the discharge of smoke from the top of the casing when the smoke producing material is ignited, the parachute being connected to the closure member by means of a cord having a swivel connection positioned far enough above the closure member when the parachute is open to be free of any residue forming on the closure member, a removable cap closing the end of the casing above the folded parachute and adapted to be removed by the pressure of the products of combustion from the smoke producing material, and means for igniting said smoke producing material.

3. A pyrotechnic device adapted to be ignited in the air comprising a casing forming a container having ignitable smoke producing material stored in the bottom thereof and a folded parachute in the top, said casing having a perforated closure member separating the smoke producing material from the parachute and providing for the discharge of smoke from the top of the casing when the smoke producing material is ignited, a cord connecting the casing with the parachute, a removable cap closing the end of the casing above the folded parachute and adapted to be removed by the pressure of the product of combustion from the smoke producing material, and means for igniting said smoke producing material.

4. A pyrotechnic device adapted to be ignited in the air comprising a casing forming a container having ignitable smoke producing material stored in the bottom thereof and a folded parachute in the top, said casing having a perforated closure member separating the smoke producing material from the parachute and providing for the discharge of smoke from the top of the casing when the smoke producing material is ignited, means connecting the parachute with the closure member including a cord and a swivel, said swivel being positioned far enough above the casing when the parachute is opened to be free of any residue formed on the casing, a removable cap closing the end of the casing above the folded parachute and adapted to be removed by the pressure of the products of combustion from the smoke producing material, and means for igniting said smoke producing material.

HERBERT C. CLAUSER.
ROBERT S. LONG.

REFERENCES CITED

The following references are of record in the file of this patent:

UNITED STATES PATENTS

| Number | Name | Date |
| --- | --- | --- |
| 785,644 | Unge | Mar. 21, 1905 |
| 1,305,188 | Bergman | May 27, 1919 |
| 1,326,493 | Gowdy | Dec. 30, 1919 |
| 1,602,037 | Mixsell | Oct. 5, 1926 |
| 1,640,892 | Gammeter | Aug. 30, 1927 |
| 1,937,220 | Driggs | Nov. 28, 1933 |
| 2,044,819 | Taylor | June 23, 1936 |
| 2,350,717 | Blair | June 6, 1944 |
| 2,397,114 | Anzalone | Mar. 26, 1946 |
| 2,436,751 | Hammell et al. | Feb. 24, 1948 |
| 2,442,528 | Beattie | June 1, 1948 |
| 2,476,125 | Van Karner | July 12, 1949 |

FOREIGN PATENTS

| Number | Country | Date |
| --- | --- | --- |
| 14,000 | Great Britain | A. D. 1896 |
| 303,594 | Germany | Feb. 7, 1918 |
| 141,187 | Great Britain | Apr. 15, 1920 |
| 816,445 | France | May 3, 1937 |